Patented Mar. 22, 1927.

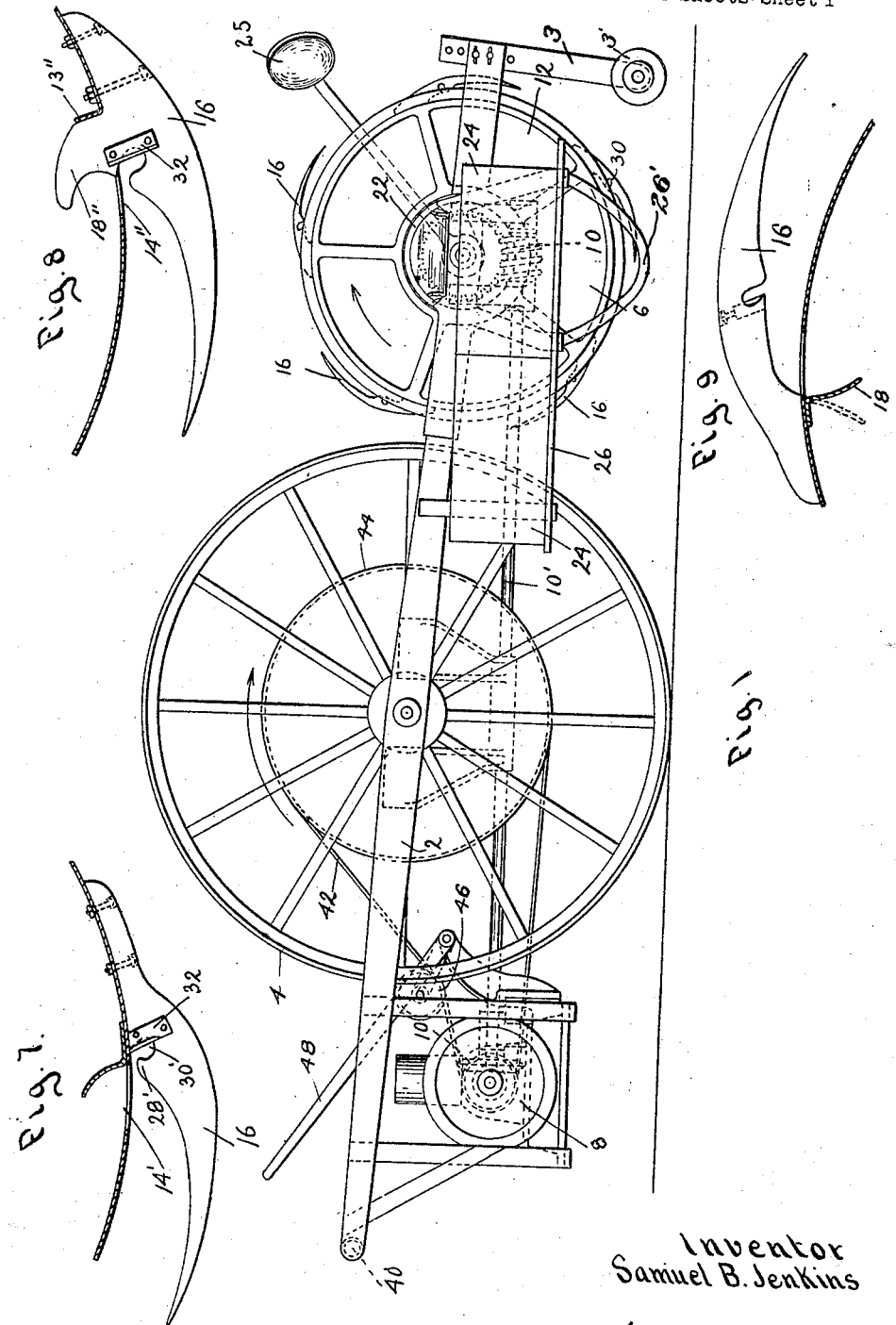

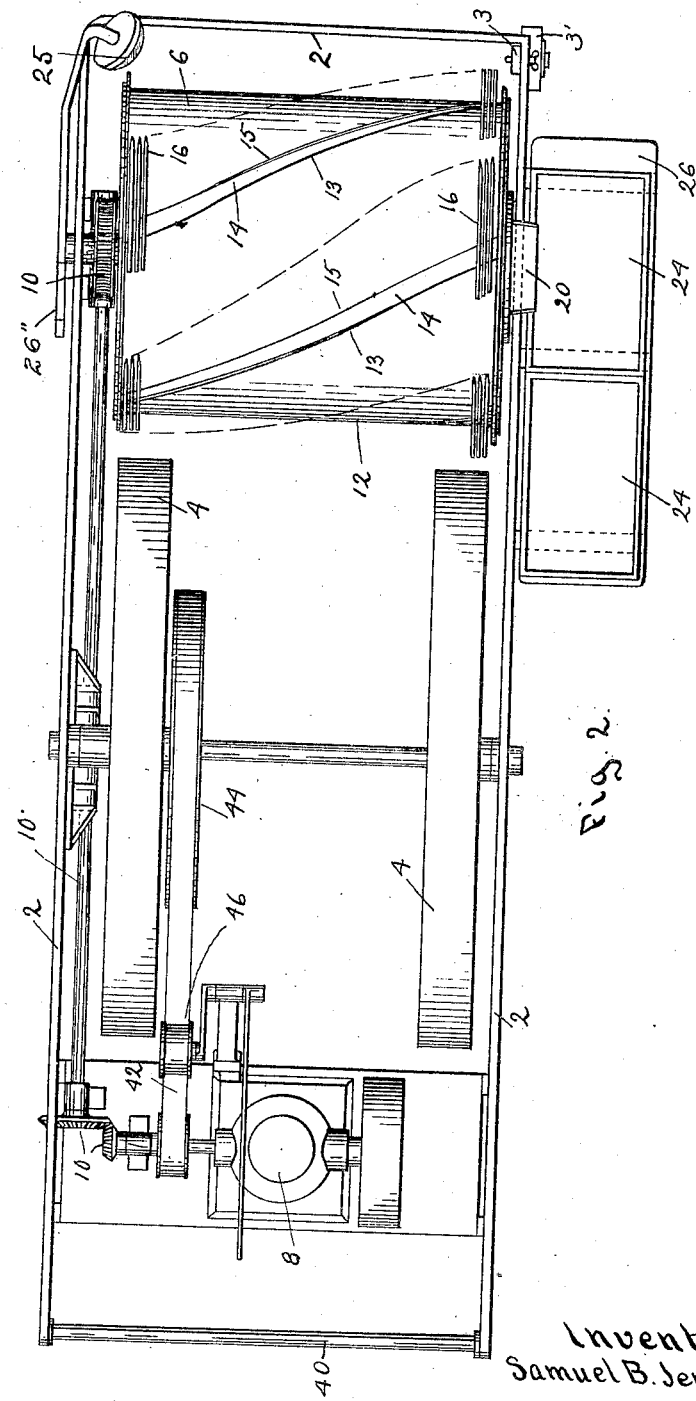

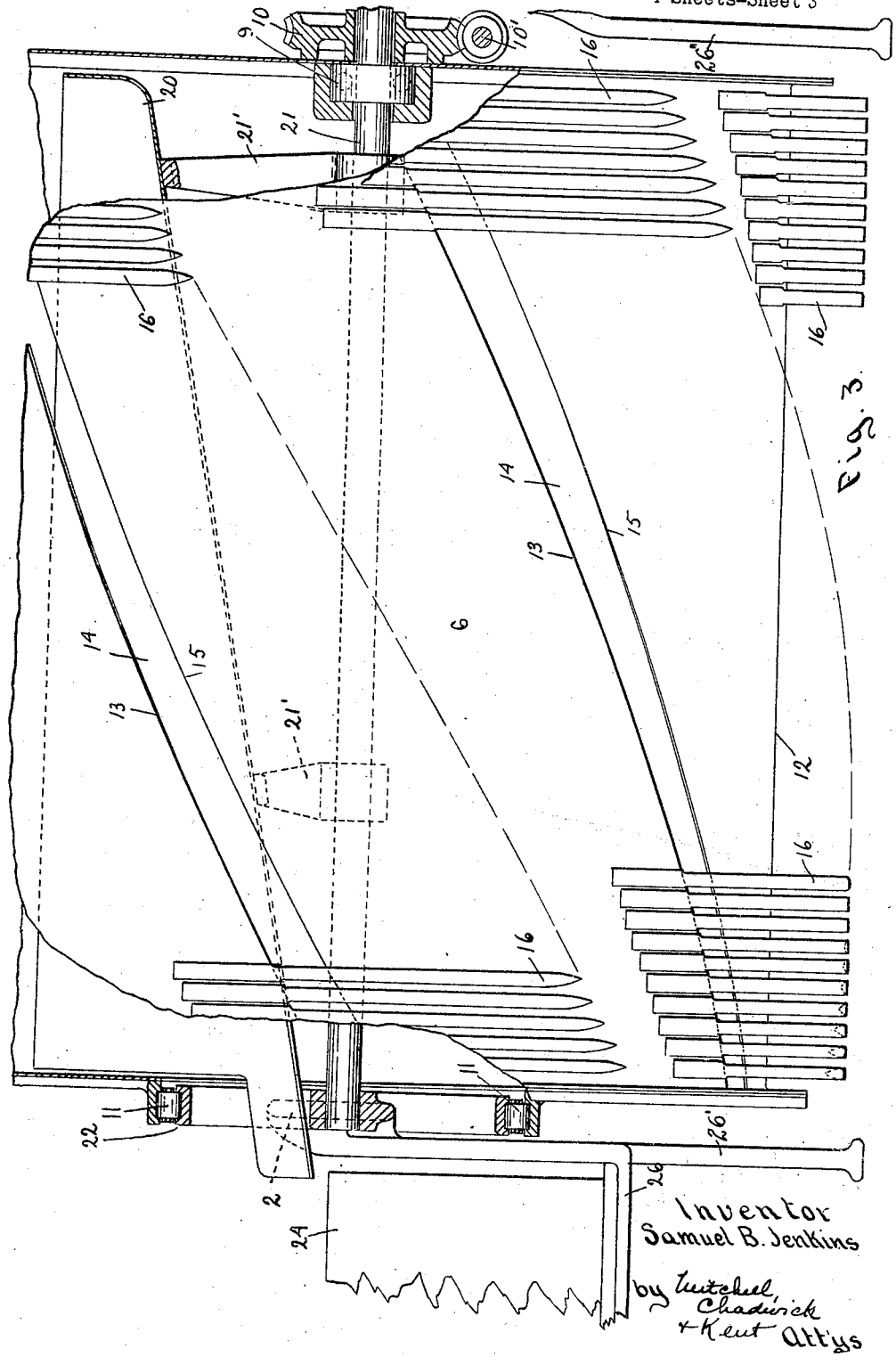

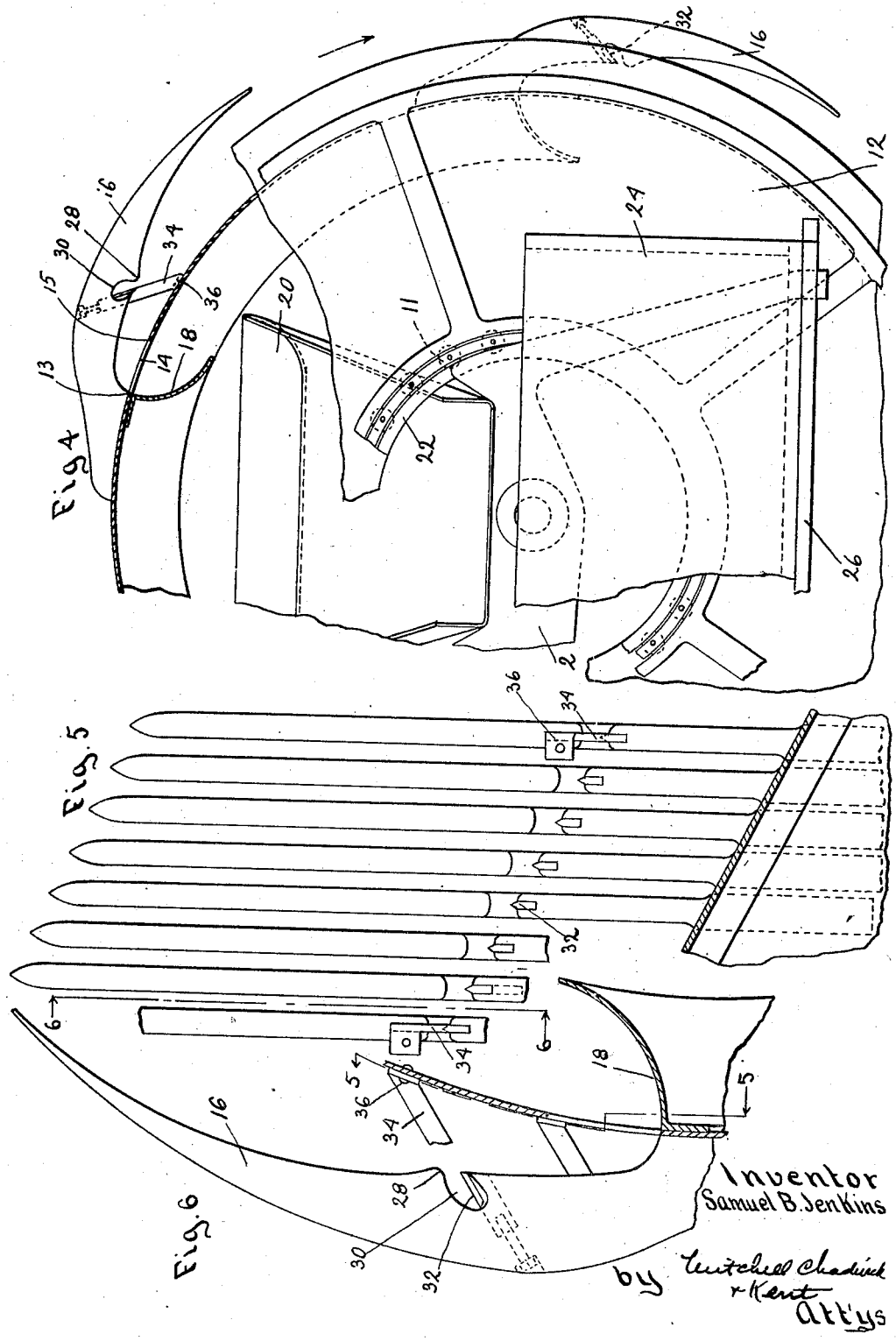

1,622,117

UNITED STATES PATENT OFFICE.

SAMUEL E. JENKINS, OF WEST BARNSTABLE, MASSACHUSETTS, ASSIGNOR TO HENRY N. SWEET, OF BOSTON, MASSACHUSETTS.

BERRY-PICKING MACHINE.

Application filed July 23, 1920. Serial No. 398,478.

The present invention relates to berry-picking machines, and more particularly to machines for picking cranberries.

Cranberries grow at about two to six inches from the ground upon vines which stand substantially upright, some growing up through long creepers that run in all directions, the whole making a mass of vines, spread over and rooted in the ground. Machines hitherto proposed for picking cranberries have depended upon the principle of having one member of the machine hold the vines while another member co-operates therewith to pull off the berries. The first-named member was designed to prevent uprooting of the vines, and the comparatively short distance between the co-operating members was thought to afford protection against injury to both berries and plants.

The object of the present invention is to provide a new and improved berry-picking machine which shall be entirely practical. Instead of the berries being pulled or dragged from their vines, they are, in apparatus of the invention, separated therefrom by the comparatively gentle and quick thrust of a rapidly-traveling pick-up comb or toothed scoop in the form of an arc of a cylinder, whose teeth move endwise down under and then move upward in a somewhat cycloidal path. Such vines as are caught in the comb and do not immediately slip out between the teeth are severed by knives on the teeth as the caught parts are carried upward being meanwhile held down by a drum surface between successive combs. The design is such that the knife is adapted to sever the vine readily, but cannot injure the berry. The berry rolls or bounds along the teeth, past the knives, to the base of the comb and across to a deflector plate, constituting a sort of curved extension of the base or "back" of the comb. This deflects the transit or escape of the berry from the scoop until it has risen to near the crest of the cycloidal path, where the berry rolls off into a stationary chute, around which the scoop revolves, which chute discharges continuously into a box or receptacle in position for easy removal. For this purpose, a series of the combs are arranged at intervals around the exterior of a cylindrical drum, projecting out a little from it, through the surface of which drum are openings, one extending along the base of each comb. The deflector is a sort of continuation of the comb within the cylinder. The invention comprises in general the provision of a suitable support, preferably a pair of wheels, holding a frame extending forward to carry the drum and combs, and extending aft to provide a handle by which the operator walking behind may depress or raise the drum at the forward end of the apparatus, so as to adjust its working elevation with respect to the vines and the surface of the ground, as circumstances require. The rear end may carry an internal combustion engine which drives and incidentally serves as a counterweight for the drum. The picking apparatus comprises the aforementioned combs mounted in succession around the drum, which is driven at a high speed of rotation with those combs which are next the ground traveling toward the rear as the apparatus moves forward under control of the operator. Each comb scoops into the area which has been passed over since the last previous comb descended; gets under the berries, the drum being maintained by the operator at a proper level to accomplish that; and then turns and swings upward as the drum rotates, the berries passing to and over the base of the comb into the drum, rolling across the deflector shelf, and then dropping upon the chute where they run down and out through the end of the drum into the receptacle carried by the frame outside. In order to permit the support of a stationary chute within the rotating drum, one of the bearings of the drum is made of large diameter, being a ring, through which the stationary shaft or axle of the drum and the protruding end of the chute may pass. The delivery of the machine can thus be continuous, the receptacles being removed as filled. The apparatus can operate at a speed much greater than has heretofore been thought practicable, and is essentially continuous in its principle of operation. Partly in consequence of its speed, the berries are more efficiently separated because of the sharpness of the blow which the vines receive from the fingers; and being once separated they are caught by the conjoint effect of their own inertia and of the scooping effect of the comb and drum movement and of the pull of gravity until by the latter they fall into the chute and roll out in a stream. The ratio of rotation of the drum to the speed of translation of the apparatus forward can be varied in accordance with the pleasure of the operator, but should be enough to cause the comb to scoop under the vines passed over since the last comb dipped down, and to pass so rapidly (considering that the effect upon the berry is the result of backward movement of the comb minus the forward movement of the whole apparatus) as to deliver its effect and to rise from the ground with the necessary smartness. Knives for severing the vines may be set in every tooth in a recess, into which recess the vine is automatically drawn, if it has been looped across a tooth, but over which recess and knife the berry bounds from a knob on the inner face of the tooth. Barrier guides for directing the vines into these recesses may be set at intervals. The principles of the invention afford opportunity for great flexibility of design, so that the embodiment of the invention here shown must be taken only as illustrative, variations in many respects being probable in practice. It is intended that the patent shall cover, by suitable expression in the appended claims, whatever features of patentable novelty exist in the invention disclosed.

In the accompanying drawings, which illustrate a preferred embodiment of the invention, including various features not above mentioned;

Figure 1 is a side elevation, more or less diagrammatical, of the complete apparatus;

Figure 2 is a plan of the same;

Figure 3 is a front elevation of the drum, showing fragments of the berry-picking combs and a section, in part, on the axial vertical plane, on a larger scale;

Figure 4 is a side elevation of the forward part of the apparatus, showing the end of the drum partly in section, on a larger scale;

Figure 5, on a still larger scale, is a sectional view on line 5—5 of Figure 6, showing a fragment of one of the berry-picking combs, looking in the direction of the arrows;

Figure 6 is a side elevation of one of the teeth of the comb viewed in section on the line 6—6 of Figure 5;

Figures 7 and 8 are side elevations of modified forms of teeth; and

Figure 9 is a side elevation of a modification of the deflector plate.

The apparatus which is herein shown as an illustrative embodiment of the invention comprises a frame 2 mounted upon a pair of wide-tread wheels 4, joined by an axle on which the frame is pivoted. The frame extends forward of the wheels to carry the berry-picking device 6, and aft, to carry a handle 40. The machine may, if desired, be manually driven, but the weight and other features are such that it is preferred to drive it from a motor 8 which may be mounted at the rear end of the frame so as approximately to counter-balance the berry-picking device 6. From this motor, the gearing 10 and the shaft 10' may transmit power to the berry-picking device 6, and another connection from the motor, made separate in order to have more perfect control of the movement of the apparatus, and illustrated by the belt 42, driving pulley 44 and controlled by an idler 46 with hand lever 48, may propel the apparatus by turning wheels 4. When the belt is tight, this may determine the relative ratio of revolution of the wheels on which the apparatus moves forward and of the drum in the berry-picking device. But the latter runs steadily at comparatively high speed, with its bottom moving backward; and the former can be disconnected instantly, if need requires, or reduced in speed by loosing the idler so that the belt slips and progress is slower.

The berry-picking device 6 comprises a rotating comb drum 12, suitably journalled to the frame upon roller bearings 9 and 11, on an axis parallel to the axis of the wheels 4. The combs are arranged exteriorly on its cylindrical wall, to which the base of each comb is secured, and are associated each with a slot or opening 14 through the cylindrical wall just in advance of the place where the comb is thus secured to the cylinder. Just within the cylinder wall, projecting inward and forward (in the direction of rotation of the drum) from the rear edges of each of these slots 14, much as the teeth 16 of the comb project outward and forward from the rear edge of the slot 14, is a deflector plate 18. The angle at which this plate projects inward from the periphery, and the distance inward to which it projects, may vary, depending in part upon the speed at which the drum is revolved. A determining factor regarding the angle is that it is desired that the deflector plate should so retard the berries that are shooting inward from the comb that, before they acquire and fully participate in the movement of the plate 18, losing their own velocity as compared therewith, they shall reach the upper part of the curve of travel of the plate, and be over the chute 20 and shall then reach the edge of the deflector plate 18 and so be carried off from it and fall upon the chute. If the deflection is too little, they will pass across the plate and strike under the chute, within the drum, being carried up and deposited on the chute by succeeding deflector plates; while if the deflection is too great they will be arrested and carried up thereon, and dropped out by gravity over the chute. It is to be assumed in the latter case, however, that the drum does not rotate so fast that centrifugal force prevents their falling. The proper relations of speeds and angles of plate can be determined for any particular apparatus by trial, and will vary somewhat with the weight of the berries. Each comb or row of teeth 16 with its associated slot 14, deflector plate 18, and the drum wall in advance of the slot beginning at the forward edge 15 thereof, constitute a separate unit of the apparatus for picking and handling the berries, comprising a sort of double scoop, one part of which is the space between the teeth and the exterior of the drum, and the other part of which is the space between the deflector plate and the interior surface of the drum wall. Preferably, these units are arranged helically on the drum, as is most clearly seen by noticing the course of the slots 14 in Figure 2, where the slots are shown as being parallel and equi-distant, and placed at intervals of one-fifth of a circumference. This frequency may be varied, as may also the pitch and direction of the helix, the purpose and advantages and limits of which are more fully explained hereinafter. The comb portion of the scoop, which separates the berries from the vines and gathers them into control, comprises the teeth 16 which are secured to the drum in a row at the rear edge 13 of each slot 14, as indicated most clearly in Figure 4, and which extend somewhat tangentially outward and forward, covering the opening and overlying the drum wall forward of it for a number of inches at a short distance from the drum wall, forming, with the drum surface, a sort of throat contracting from the tips of the teeth to the slot. The distance between the teeth 16 at their pointed tips is ample, but nearer their bases is small enough so that none but the very smallest berries escape between them, yet vines pass freely between them. The helical pitch of the slots 14, in their course across the drum from side to side of the apparatus determines the line on which the bases of the teeth are set, and thus determines the line on which the points of the teeth are set, so that the same number of teeth would be intersected by any plane through the axis of the drum. Thus the same number of teeth will be actively engaged at any instant in the mass of vines according to the manner herein described. It results from this structure that the motor will operate the drum 6, under approximately constant torque, except as the vines themselves vary, and that the vines will be combed and the berries thereon picked at a substantially constant rate.

The shape of the teeth may be varied, but as illustrated each has a sufficiently long base to afford opportunity for secure fastening to the surface of the drum at the rear edge 13 of its slot 14, and extends outward and forward therefrom curvilineraly. As illustrated, the forward half of the length of the tooth has an external curvature substantially that of a circle around the center of the drum, while the rear half gradually draws in toward the surface of the drum. The inner face of a finger or tooth is also a curved line, the tooth growing gradually thicker from its point to the rear, and about two-thirds of the way along having a knob or protuberance 28 inward toward the drum surface, followed immediately by a recess 30 set sharply and deeply into the tooth, backward and outward, to a greater radial distance from the drum center, too narrow to admit a berry but wide enough to admit a vine, after which the gentle curvature toward the drum surface is resumed until the slot has been passed, where the shape approaches the drum surface approximately at the base of the tooth, at the rear edge 13 of the slot 14. In the recess 30 is set a knife or saw blade 32 which may be secured as indicated in Figure 6, for cutting vines, as hereinafter described; and on occasional teeth, for example, on every eighth tooth, there may be a long blade 34 similarly located and secured and sharpened where it is exposed in the recess 30 thereof, while the blunt edge crosses the throat to the drum wall, to which it is secured at 36, serving as a barrier to guide vines into the recesses, to be cut. Within the drum, and projecting forward and inward on a straight, or, preferably, a curved line, as indicated, is the deflector plate or shelf 18 which is encountered by berries which have passed in through slot 14. All of these parts rotate with the drum; but within the drum is a stationary element comprising a chute 20, seen in Figures 3 and 4, which as portrayed is set in the upper half of the cylindrical space on a cross bar or axle 21 at the axis of the drum, by brackets 21'. It is inclined toward and passes out through the space within the ring bearing 22 of the drum, and delivers by gravity into a box 24 which may rest on an exterior platform 26 capable of holding two, so that an attendant can easily change the boxes as they become filled, while the machine is in operation.

In operation, the rapid revolving of the drum, as the apparatus is moving slowly forward on wheels 4, carries the teeth down into the bed of vines to whatever depth the operator elects by his management of the rear handle 40, elevating or depressing the same. The combs, moving swiftly downward and backward, and then upward, on a curved path the form of which varies according to the relation between speed of progression of the apparatus and speed of rotation of the drum, dip in under the berries, (which in the case of cranberries grow not nearer than two inches to the ground); strike the vines smart blows which ordinarily separate the berries from their vines; and then rise with the berries caught in the comb, and with more or less of the vines thus caught. The berries being hard and elastic, skip along the inner sides of the advancing teeth further into the contracting throat between the teeth and the cylindrical exterior of the drum until they reach and pass through the slot 14. Strictly speaking, the berry is not driven forward of the machine, because that part of the machine which encounters it, is moving in the backward direction; but the movement of the tooth is so rapid in the backward direction, that the effect is the same as if the berry were driven forward with respect to that part. The tooth thus gets rapidly further under the berry, and the rise of the comb from the ground is sufficiently rapid so that the berry is thus scooped and caught, and lifted by the backwardly moving teeth which promptly turn upward. The inside concavity of the comb teeth, by making the angle of incidence of the tooth against the berry gentler than it would be if the teeth were straight, and by getting the tooth further under before touching any particular berry, reduces the opportunity of the berry to escape. The direction of rise depends in part on the relative speeds. Starting from its lowest point of rotation, any point on the inner face of the comb would rise in a circle if the apparatus were stationary, or in a cycloidal curve if the comb drum were both moving forward and rotating at such speed as to be equivalent to its rolling forward. The actuality is something between these two extremes, and at all events the drum is rotating much faster than a mere rolling, and when it is advancing, by the forward movement of the whole apparatus, the rise of such a point during its first quadrant is backward, unlike a cycloid, and is steeper than the curve of a circle. The second and third quadrants are prolonged and are flattened in curvature of path because the progress by translation is added to that by rotation; and the fourth and first quadrants are shortened and made steeper because the progress by translation reduces the retrogression by rotation. The combined effect is that the comb, scooping down backward and then turning sharply upward, catches the berries loosened by its impact on the vines, and gently removes them by raking or combing the vines. Inertia holds down vines, which would be picked up if the combs were moving more slowly. The combs sweep past or break or cut them, but gather the berries.

The berry action can be imagined by looking at Figure 4 in an inverted position, and, considering the status of berries caught above that tooth 16 which is at the bottom of the figure when thus inverted. This figure may be assumed to represent the conditions when a tooth is rising from the ground. Under those circumstances, the berries passing on from it into the slot 14 will roll on to the deflector plate 18. If they rebound, they will strike the interior of the adjacent drum wall. Berries will be influenced by inertia and by gravity, while the tooth passes through the position shown next in advance, in the inverted Figure 4; and all will be spilled out over the edge of the deflector plate 18, when it is passing through the upper part of its circuit, and be dropped into the drum and into the chute 20, as will be better understood by considering Figure 4 when restored to its upright position, assuming, of course, that the speed of the drum is not so great as to cause their retention by centrifugal force. Being thus tipped out, they run down through the stationary chute 20 into the box 24 ready for inspection, clearing and market.

Considering Figure 1, and supposing that the apparatus is pushed forward and the drum is rotated at such a rate that each comb strikes into the vines only an inch or so in advance of where the last struck in, it will be readily understood how the combs may advance by such easy stages as will gradually straighten any cross vines or upstanding vines that are capable of being straightened, so that later combs pass through them more readily; or else that small sections of these will be picked up by the teeth and either broken off or drawn taut as the tooth or teeth engaging any such moves upward on its circuit; and after being stretched over a knob 28 will slip down into the recess 30, and will be drawn against the knife blade 34, which will sever it. Cross vines not tight enough to be drawn into such a recess will be arrested by encounter with some two of the blades 34, which cross the throat at intervals of every few teeth, in season to be drawn into a recess at each end and be severed in two places. If the vines are not cut, they may follow the drum completely around to the ground again. They will not interfere with the described action of picking, but will be acted upon by the newly attacked vines and, by friction and association, with them will be ultimately forced between the teeth or into a recess against a knife in company with others. Thus the drum is prevented from winding up vines which are attached to the ground. And as the vines are held slightly by the protuberance 28 when they finally slip over it, they are drawn rather tightly against the knife blade 32 with a drawing cut, thus increasing the certainty of their being cut thereby.

The distance between combs set on the exterior of the drum is an element entering into computation of the ratio to the speed of rotation and of translation of the whole apparatus, for each comb which comes down should traverse all of the zone of vine covered ground which has not been traversed by the tooth next preceding it in line. Preferably, this should be but a narrow zone; and if this plan be adopted, the number of berries caught by each dipping in of a comb will be few, and the vines incidentally entangled will be easily handled.

While the apparatus may progress at speed varying through a wide range, and there may be a wide variety in the relation of speed of the drum and of the teeth thereof to the speed of revolution of the supporting wheels, it may be noted that the relation will be advantageous if the gearing is such that the drum makes about 200 revolutions while the apparatus progresses about 100 feet over the ground. This makes two revolutions per foot, and, with six combs instead of the five illustrated, would make a sweep of a comb for every inch of progression. The rate of progression will generally be variable, depending on the character of the ground, vine bed, berries, etc. The gearing, however, may be arranged to produce such a ratio. If the progression were one hundred feet per minute, which is about double the speed that may be found generally useful, the output of such a machine, depending, of course, on actual conditions, might be a barerl or so of cranberries per minute. Considering each row of teeth extending across the drum, if these are arranged in helical lines, as illustrated, only a part of each comb will be engaged at any particular instant; and the stress on the fastenings of each comb is thereby greatly less, and its relative strength out of proportion to the work done by the whole comb.

As the method of construction proposed involves the making of a continuous slot from one end of the drum to the other for each comb, it will be understood that the portions of drum wall intervening between slots are sustained at the ends of the drum, and that the arched formation or curvature thereof due to the cylindrical shape of the drum, and to the helical form of the strip, together with the deflector plate acting as a web, produces a stiffness which makes possible the use of a relatively light metallic sheet for the drum wall. Neither the chute nor the deflectors 18 constitute a receptacle for berries in any true sense, these parts being merely deflectors and guiding contrivances, so that the berries, from the time of separation from the vine by the blow of the comb, do not come to rest until they settle in the standard cranberry box on the outside of the apparatus; but if they are spilled over so that they do not enter the chute 20, they will be picked up again by some one of the deflector plates 18, for deposit in the chute.

One feature contributing to the keeping of the berries in motion across the deflector plate is the inblowing draft of air which accompanies the berries, for the combs, projecting out from the drum surface, act somewhat like the vanes of a blower or a turbine in drawing in air which as it enters sweeps along the deflector plates. While cranberries vary individually, they are relatively light when ripe and picked, with low specific gravity owing to the four large air spaces within the berry, and this explains why the drum can run at high speed, without the berries being prevented by centrifugal force from being discharged into the chute. If the deflector plates are made of thin sheet metal, those plates can be bent at their delivery edges to approach more closely to the radial direction than they do in Figure 4 until a point is found, by experiment, which will vary for different speeds and for different run of berries, and more or less also for different shapes of teeth, in which the berries move inward from the comb and across the deflector plate into the chute without losing continuity of the inward progression which begins when they are picked up by the scooping comb. Thus the inertia of the berries and the draft of air together combine to direct the berries inward when the speed is too fast for gravity to be fully effective to cause the berry to drop into the chute; and in case the delivery to the chute proceeds with so great a speed that the berry passes free of the deflector plate before reaching an elevation sufficient to enter the chute when arranged as illustrated in the present drawings the chute may be set at a lower elevation.

The teeth are herein illustrated as being made of wood, which has some advantages of manufacture and also for the securing of the knives thereto; but if preferred, the teeth might be stamped from sheet metal and tinned. In shape and dimension, the tooth should naturally be made as is found in practice to work best with the particular variety of berries that are to be gathered thereby. It is believed, however, that a setting of about twelve teeth to the foot with distances between the teeth amounting to 16/32 inches near the points, 9/32 inches in the middle, and 12/32 inches close up to the shank will be found effective. Alternative forms of teeeth are shown in Figures 7 and 8. In Figure 7, a knob 28' and recess 30' are not reached by the vines until the slot 14' where the berries enter the drum has been passed. In Figure 8, the tooth is so shaped that it sets in through the slot 14", the deflector plate 18" being made up of a succession of formations on the teeth, each integral with the rest of its tooth; and the tooth is more firmly secured by having a backing of the flange 13" which is bent radially inward at the rear edge of the slot 14".

In Figures 7 and 8, the blade 32 for severing the vines is set on the side of the tooth and is made of very thin sheet metal such as is well known in connection with flexible razor blades. Figure 9 illustrates in full lines a position which may be found useful for the deflector plate of apparatus as in Figure 4, but operated at a higher speed, so that less deflection of the berry is needed from the motion imparted to it by the inner face of the comb; and it is conceivable that in some cases the deflector plate may be made in the shape indicated in dotted lines in Figure 9, where in effect it loses its utility, and the berry proceeds into the drum undeflected from the course which it has at the base of the tooth. Although for purposes of the present drawings, which are somewhat diagrammatic, the deflector plate 18 is shown of equal thickness with the drum, it will be understood that these parts will be made of such thickness as are suitable for their purposes, the drum being stiff, and the deflector plate being thin enough to be bent for adjustment to different speeds in any case in which it is desired to test the same machine at different speeds. In understanding the operation of the machine, it is well to differentiate between the customary slow "approach" of hand pickers and of all machine pickers heretofore proposed, so far as known to me, which have caused the vines to be picked up and drawn along by the picker, and the rapid "attack" of the combs in the machine of the present invention, in which advantage is taken of the inertia of the vines so that for the most part the vines stay down and the combs slip through them and the actual separation of the berries from the vines mostly occurs with the vines on the ground, and is followed by quick removal of the berries therefrom. For the better guidance of the operator in managing the machine, who is prevented from seeing directly the growth or vines into which the combs are about to strike, owing to the intervention of the mechanism between himself and this place, a mirror may be provided with adjustable support to show the vines and ground close in advance of the drum, or, if preferred, and as illustrated at 25, the mirror may be slightly convex, in which case it need not be adjustable.

In regard to those cross vines which get caught and carried up backward by the teeth, it will be understood that the continuous surface of the drum which follows behind each comb keeps the vine down near the ground, in so far as it lies under the drum. In so doing it safeguards the berries which are further in advance on ground not yet reached, by avoiding lifting the mass of vines in advance of the drum. When the machine is in operation the large diameter of the pair of supporting wheels makes the whole apparatus ride easily over rough ground and provides a fulcrum for the picking drum at a sufficiently high elevation to permit ready manipulation of the drum by the operator. The provision of power driving mechanism for both wheels and drum leaves the operator largely free to guide and to manipulate the drum, to look out for stumps, stones and hummocks. The tendency of the drum to draw itself down to the ground on engaging vines may be safeguarded by the addition of a support, as is illustrated, for example, at 26′, where a metal bow is shown running down from the exterior receptacle support to a level just below the lowest level of the drum teeth. There may be a corresponding support 26″ down from the other end of the stationary axle 21. The same high speed of the picking comb which relieves the need of providing a co-operating picking element, which has been present in the previously proposed machines, provides a certain degree of forward draft, so that the machine tends to claw itself forward. It is obvious that the power driving mechanism for forward progress may be omitted and the machine pushed ahead by hand aided by such pull as comes from this action of the drum. It should be understood moreover that the drawing does not purport to show actual ratios of gearing, but is merely to show how gearing may be arranged, the principles governing its design and proportion being set forth in the specification.

I claim as my invention:

1. A berry picking machine having, in combination, a rotary drum having a berry-excluding surface; combs arranged at intervals around the drum having teeth projecting therefrom and extending in the general direction of the drum surface with their berry-engaging tips a little outside of said berry-excluding surface, whereby an entrance throat is formed between such surface and the comb; there being an opening through said surface to the interior of the drum at the base of the comb, and the apparatus being arranged with the tips of the teeth of said comb to make the initial contact of the apparatus with vines that are to be picked; means to revolve the drum and simultaneously to advance it over the ground; and means within the drum to receive berries that have entered through said throat and to guide them laterally out through the end of the drum.

2. A berry picking machine having, in combination, a revoluble picking comb, having teeth with tips for initial contact of the apparatus with vines and berries which are to be picked, and with a back portion leading berries thence to the base of the teeth and back of the comb as the comb is rotated, for discharge from it to the interior of its orbit; means within its orbit to receive the berries thus discharged and to deliver them continuously through the end of the space enclosed by the revolving comb, wheels adapted to support the revolving comb and to advance it over the ground arranged in the rear thereof; and means to revolve the comb simultaneously with the revolution of the wheels and more rapidly, whereby each revolution of the comb occurs in a fraction of the space covered by the revolution of the wheels.

3. A berry picking machine comprising, in combination, a wheeled support, constituting a fulcrum, a lever thereon having a handle at the rear and projecting forward of said support, a revoluble picking comb at the forward end of said lever supported at variable elevation thereby; and a motor supported on the lever at the rear of the fulcrum and adapted to drive the comb and to a degree to balance it.

4. A berry picking machine having, in combination, a revoluble picking comb, a wheeled support therefor, a motor for driving both the comb and the wheels, and means for the operator to vary the relative speed of these two driven mechanisms at will.

5. A berry picking machine having, in combination, a revoluble drum, and a plurality of berry picking combs mounted thereon, each projecting upward therefrom and overlying a portion of the drum wall, there being portions of the drum wall intervening between adjacent combs, and the drum wall having openings underlying each comb at its base; means to revolve the drum and simultaneously to advance it over the ground, and means to receive the berries picked by the combs.

6. A berry picking machine having, in combination, a revoluble comb with supporting and revolving means therefor, in which the teeth of the comb are separate units, supported on and projecting outward from a revolving element comprising a drum which has passages through it adjacent to the bases of the teeth.

7. A berry picking machine having, in combination, a revoluble comb with supporting and revolving means therefor, in which the teeth of the comb are separate units, and the support comprising a drum from which the teeth project outward and there being an opening through the drum through which root-like portions as of the teeth project inward, the root-like portion of the teeth guiding the berries after they have passed through the drum at the base of the teeth.

8. A berry picking machine having, in combination, a revoluble comb with supporting and revolving means therefor, in which the teeth of the comb are separate units, and comprising a drum in which the teeth project outward, there being space to carry berries upward within the teeth and outside of the drum; the drum having an opening through itself at the base of the teeth; and there being deflector means within the drum to guide berries moving inward.

9. A berry picking machine having, in combination, a berry picking comb mounted and adapted to be moved over the ground and to revolve, with its part next the ground moving backward as regards the general direction of progress; there being a barrier, impenetrable by the vines, forward of the place where the rearward and upward moving berry picking teeth of the comb are at any instant, and nearer than they to the axis, to prevent said teeth from lifting the vines engaged by them from the ground beyond the degree predetermined by said barrier.

10. A berry picking machine having, in combination, a berry picking comb mounted and adapted to be moved over the ground and to revolve, with its part next the ground moving backward as regards the general direction of progress; there being a barrier, impenetrable by the vines, forward of the place where the rearward and upward moving berry picking teeth of the comb are at any instant, and nearer than they to the axis, to prevent said teeth from lifting the vines engaged by them from the ground beyond the degree predetermined by said means, and vine severing barrier located in position to act upon vines thus drawn taut by said upward moving teeth.

11. A berry picking machine having, in combination, a revoluble picking comb, means to mount and to move the comb forward over the ground; said comb being arranged with the tips of its teeth constituting the initial contact of the apparatus with the berry vines; and means to revolve the comb; the whole being organized and arranged for the path of the teeth in their picking cycle to be circular with respect to the axis on the machine, and to be backward, downward and upward with respect to the vines; and means forward of said backward and upward moving teeth to receive the berries picked by them.

12. A berry picking machine having, in combination, a revoluble picking comb, means to mount and to move the comb forward over the ground; said comb being arranged with the tips of its teeth constituting the initial contact of the apparatus with the berry vines, and means to revolve the comb at sufficiently high speed for the inertia of the berries to be effective in causing the berries receiving a backward blow by the teeth, to move forward relatively and be captured as the teeth move backward under them.

13. A berry picking machine having, in combination, a revoluble picking comb, a body having a surface inside of its circle of revolution forming therewith a throat to receive berries, said machine having an opening to the interior of the orbit through said surface near the base of the comb, whereby an indraft of air is constituted aiding the movement of the berries along said throat and into the interior; and means to revolve the apparatus at a speed sufficient to produce said indraft.

14. A berry picking machine having, in combination, a revoluble drum with a plurality of picking combs arranged around its surface and having openings into the interior of the drum for passage of berries from the picking combs, guiding means within the drum for the inward moving berries, stationary means within the drum to receive the berries and discharge them to the outside of the drum, and means to revolve the drum at high speed relative to the rate of progress; the said guiding means being adapted to permit each berry to move inward to the receiving means under its momentum acquired in passing along the teeth.

15. In a berry picking machine the combination of supporting wheels, a frame extending forward and aft pivoted thereon, having aft a manipulating handle and having forward a stationary axle; a drum revoluble on the axis of said axle having berry picking combs externally, and openings through which berries picked thereby pass into the drum; a ring bearing at one side for said drum; a stationary chute within the drum, supported on said axle, receiving berries entering through said openings and inclined and extending so as to deliver them through said ring; a receptacle for berries from the chute supported on said frame at the end of the drum; and power means to revolve the drum.

Signed at Barnstable this 10th day of July, 1920.

SAMUEL B. JENKINS.